Jan. 13, 1970  CHIHIRO AOKI  3,489,493
DEVICE FOR CHANGING FILM-FRAME TRANSPORT SPEED IN
SMALL-SIZED MOTION-PICTURE PROJECTOR
Filed July 5, 1967  3 Sheets-Sheet 1

Chihiro Aoki,
Inventor
By Wenderoth, Lind & Ponack,
Attorneys

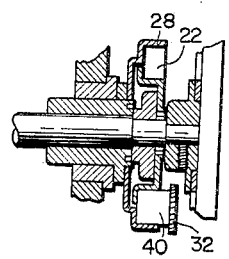
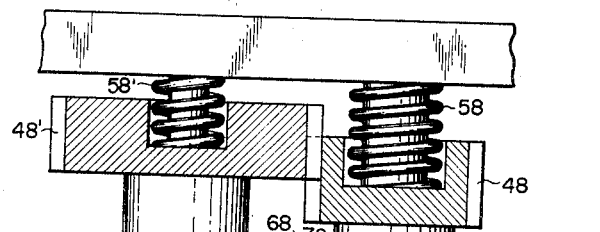
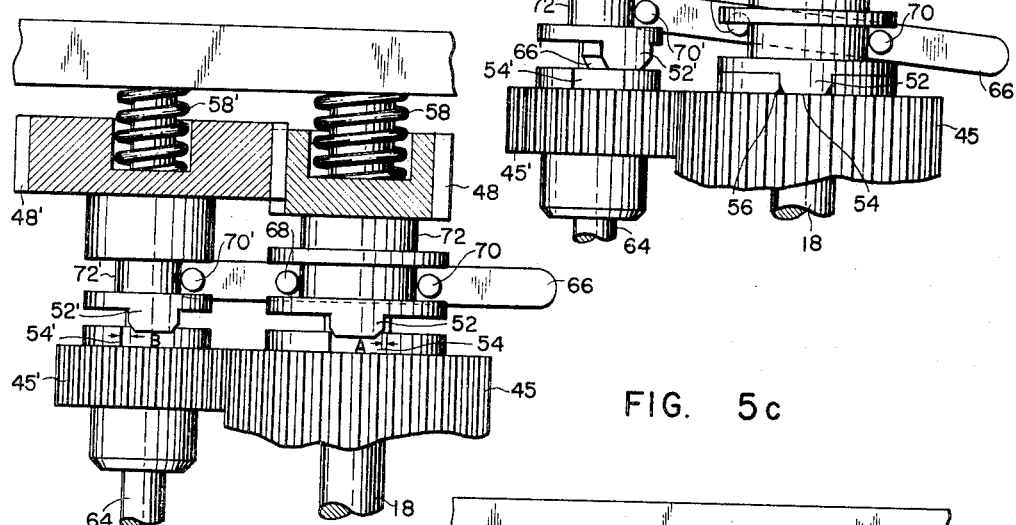
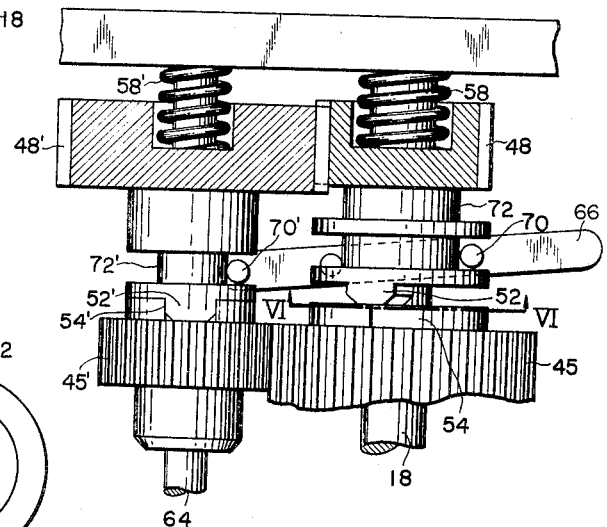
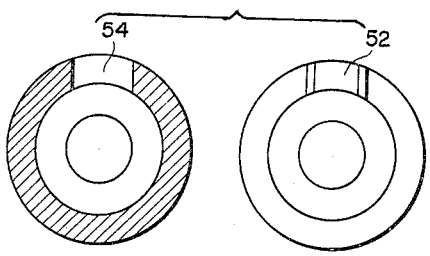

United States Patent Office 3,489,493
Patented Jan. 13, 1970

3,489,493
DEVICE FOR CHANGING FILM-FRAME TRANS-PORT SPEED IN SMALL-SIZED MOTION-PICTURE PROJECTOR
Chihiro Aoki, Aichi Prefecture, Japan, assignor to Elmo Company Limited, Mizuho-ku, Nagoya, Japan
Filed July 5, 1967, Ser. No. 651,201
Claims priority, application Japan, July 12, 1966, 41/45,037
Int. Cl. G03b 21/48
U.S. Cl. 352—180                         2 Claims

ABSTRACT OF THE DISCLOSURE

A motion picture projector drive mechanism comprises a main cam fixed on a shutter shaft to control vertical and horizontal rocking of a film feed claw and an auxiliary cam mounted on the shaft for relative rotation to control only horizontal rocking of the claw. The auxiliary cam has an angle of action equal to or less than that of the main cam for horizontal rocking of the claw. Mounted on the shaft are two gears serving as a dog clutch and one of them operates transport sprockets and is rigidly connected to the auxiliary cam. Another shaft parallel to the shutter shaft includes two gears meshing with the gears on the latter shaft and also acting as a dog clutch. An operating lever always puts one of the clutches in its operative position while simultaneously putting the other clutch in its inoperative position. With the clutch on the shutter shaft in its operative position both cams are rotated together at the standard speed for the normal projection. With the other clutch in its operative position, the auxiliary cam is rotated at a predetermined fraction of the number of rotations of the main cam for a slow-motion projection. Each clutch includes a single jaw adapted to engage an associated notch and having a tapered end portion. At a time during movement of the lever, both jaws simultaneously and partially engage the respective notches with a clearance formed between them. This ensures that the positional relation between the shutter and cams remains unchanged.

---

This invention relates to a device for changing the film-frame transport speed in a small-sized motion-picture projector by which a projection can not only be effected at the standard frame transport speed but also a slow-motion projection at a speed less than the standard speed or a slow-motion projection can be effected without the flicker effect.

One type of the well known systems for changing a film-frame transport speed has comprised a mechanism for intermittently transporting a length of cinefilm including cam means for imparting predetermined vertical and horizontal rocking movements to a film feed claw, the cam means being composed of a vertical and horizontal cam adapted to be rotated either together at a common speed or rotated with a predetermined speed ratio through a speed reduction gearing, the arrangement being such that the horizontal cam reduces the number of rotations as compared with the standard number of rotations of the vertical cam to cease the horizontal rocking movements of the feed claw a certain number of times per the standard number of its rocking movements thereby to permit a slow-motion projection.

Also there is known another type of the systems referred to somewhat more complicated in construction than the type as above described. That type has comprised a main cam composed of a vertical and a horizontal cam portion integral with each other, a face cam operatively coupled to and always rotated more slowly than the main cam, and a lever capable of being resiliently contacted by and separated from the face cam. If the lever is in disengagement from both the face cam and the film feed claw the normal projection can be effected. However, if the lever cooperates with both the face cam and the feed claw the lever controlled by the face cam causes the feed claw to be put out of the region of the vertical main cam portion whereby a slow-motion projection is permitted.

According to the above-mentioned systems of changing the frame transport speed, a slow-motion projection is effected without a flicker effect. However, the film feed claw effects rocking movement along a path in the normal projection different from that in a slow-motion projection. More specifically, upon effecting a slow-motion projection the vertical or main cam as the case may be is rotated at the standard speed while the associated horizontal or face cam is slowly rotated as compared with the vertical or main cam. Accordingly the feed claw will cause such rocking movement that for a given interval of time, its vertical displacement is of the standard type whereas its horizontal displacement decreases in dimension. As a result an angle of action upon the feed claw of the vertical cam shifts in phase from that of the horizontal cam leading to a difference between loci which the feed claw depicts at the standard frame transport speed and at a reduced speed for a slow-motion projection. For example, if it is assumed that the feed claw depicts a locus in the form of a perfect rectangle at the standard speed then it will depict a locus generally approximating an equilateral trapezium in a slow-motion projection because the feed claw is moved to effect horizontal rocking movement before it has completed its vertical rocking movement.

On the other hand, the feed claw should have a predetermined stroke in each of the vertical and horizontal directions. Therefore, if in the systems as previously described the feed claw decreases only in the number of horizontal rocking movements, the duration for which the claw is in engagement with the associated film portion inevitably increases resulting in an increase in closure angle of the associated shutter and accordingly a decrease in brightness of projected pictures. In an extreme case the feed claw may fail to engage any perforation on the film. Therefore, if the systems for changing the frame transport speed is operated to decrease excessively the frame transport speed various difficulties will be caused.

It is accordingly, a general object of the invention to eliminate the above-mentioned disadvantages.

It is an object of the invention to provide a new and improved device for changing the film-frame transport speed in a small-sized motion-picture projector permitting a film feed claw involved to depict a locus at the standard frame transport speed substantially identical to that depicted at a reduced speed suitable for a slow-motion projection.

Briefly, the invention accomplishes the above cited objects, and objects, by the provisions of a device for changing the film-frame transport speed in a small-size motion-picture projector with a shutter having $n$ sectors, comprising a film feed claw; main cam means rigidly connected on a shutter shaft including a vertical cam for imparting to the feed claw a predetermined vertical rocking movement within a closure angle of a shutter and a horizontal cam for imparting to the feed claw a predetermined horizontal rocking movement within the closure angle of the shutter, the vertical and horizontal cams being integral with each other; auxiliary cam means mounted on the shutter shaft for relative rotation to impart to said feed claw a predetermined horizontal rocking movement within the closure angle of the shutter, the auxiliary cam means having an angle of action equal to or less than said main cam member for horizontally rocking the feed claw means for connecting the auxiliary cam means to the main cam means to rotate both means together at the standard speed of frame transport for the normal projection, said connecting means including speed reduction means for reducing the speed of said auxiliary cam means to 1/n of the standard speed of frame transport for a slow-motion projection, said feed claw being always in resilient contact with said main and auxiliary cam means while effecting rocking movement controlled only by said main cam means and remaining unchanged between the normal and slow-motion projections.

Preferably the shutter shaft may be provided with clutch means including one half clutch having a single jaw capable of engaging the associated notch formed on the other half clutch, with jaw having a tapered end portion. Similar clutch means are disposed on a shaft disposed in spaced parallel relationship with respect to the shutter shaft. Both clutch means are arranged such that through the operation of an operating lever one of them is in its operative position while at the same time the other is in its inoperative position and that at a time during movement of the lever both jaws simultaneously and partially engage the respective notches with a clearance formed therebetween.

This invention will become more readily apparent from the following detailed description taken in conjunction with the accompanying drawings in which:

FIGURE 1 is a plan view of a motion-picture projector embodying the principles of the invention;

FIGURES 2a and b are sectional views taken along the line II—II of FIGURE 1 and illustrating the present device in its different positions with certain parts shown in elevation;

FIGURE 4 is a fragmental sectional view taken along the line IX—IV of FIGURE 2a and illustrating the positional relationship between a main and an auxiliary cam and a film feed claw;

Figure 7:
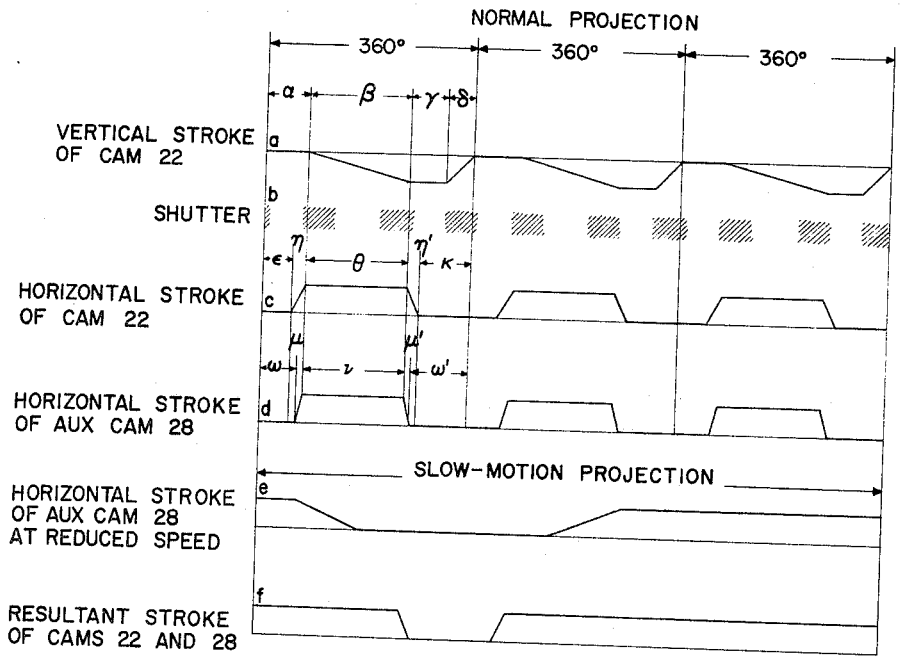
Figure 8:
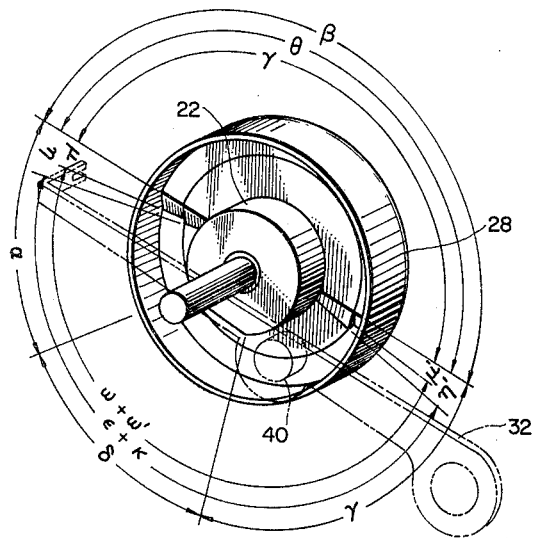

FIGURES 5a, b and c are diagrammatic views useful in explaining the operation of a dog clutch;

FIGURE 6 is a plan view respectively of a clutch jaw and a clutch notch as viewed on the line VI—VI of FIGURE 5c;

FIGURE 7 is a graph useful in explaining the operation of the main and auxiliary cams; and FIGURE 8 is a fragmental perspective view of the main and auxiliary cams with the feed claw shown in phantom.

The invention is based upon Japanese Patent No. 274,256 assigned to the same assignee as the present application. The cited patent discloses a system of changing a film-frame transport speed in a motion-picture projector wherein the number of operations of closing a shutter and of vertical reciprocating movements of a film feed claw per unit time are common multiples of the numbers of frames transported respectively for the same unit time at least two frame transport speeds between which changing is to be made while only the number of horizontal rocking movements of the feed claw for the unit time is variable. By utilizing the system just outlined, the invention causes a film feed claw to rock along a closed path which remains unchanged between the standard frame transport speed for the normal projection and a reduced speed for a slow-motion projection. By the term "vertical" is meant the direction of motion of the travelling cinefilm and by the term "horizontal" is meant a direction normal to the plane of the travelling film.

According to one aspect of the invention, a shaft for a shutter having n sectors has rigidly secured thereon a main cam member including a vertical cam for imparting to a film feed claw involved a predetermined vertical rocking movement and a horizontal cam member integral with the main cam member to impart to the feed claw a predetermined horizontal rocking movement. Mounted on and rotatable about the axis of the shutter shaft is an auxiliary cam member for imparting to the feed claw only a predetermined horizontal rocking movement and having an angle of action such that the feed claw horizontally rocks an amount equal to or less than that of the main cam member. The feed claw is always held in resilient contact with the main and auxiliary cam members and is rockable about its fulcrum in the vertical and horizontal directions. The main and auxiliary cam members may be driven together at a common speed or the standard frame transport speed for the normal projection. Alternatively the auxiliary cam member may be driven through a speed reduction gearing at a speed equal to 1/n of the speed of the main cam member for a slow-motion projection provided that the shutter has n sectors.

Since the auxiliary cam member has an angle of action equal to or less than the main cam member and the feed claw horizontally rocks as previously described, the main cam member controls not only rocking movement of the feed claw in the normal projection for which the main and auxiliary cam members are rotated together at the common speed but also it controls such movement of the feed claw in a slow-motion projection in the same manner as in the normal projection but less frequently.

Specifically, the event of the slow-motion projection for which the auxiliary cam member is driven at a speed corresponding to 1/n of the number of rotations of the main cam member where n is the number of shutter sectors, the auxiliary cam member inhibits only the horizontal rocking movement of the feed claw controlled by the main member $(n-1)$ times per the standard number of its rocking movements. As previously described, the feed claw is continuously in resilient contact with both main and auxiliary cam members and the auxiliary cam member has an angle of action equal to or less than the main cam member so that the feed claw effects its horizontal rocking movements. This ensures that the main cam member alone controls the horizontal rocking movement of the feed claw whereby the feed claw engages the adjacent film portion once per the standard number of rotations of the main cam member.

Therefore the feed claw can depict the same locus of rocking movement at whatever low speed of frame transportation.

According to another aspect of the invention the auxiliary cam member is rigidly connected to a driving member for driving film transport means such as a sprocket wheel. This permits the driving speed of the sprocket wheel automatically to vary in response to a change from the normal projection to a slow-motion projection and vice versa because the auxiliary cam member is driven at a speed dependent upon the type of projection. Further the driving member forms a part of clutch means for changing the speed of rotation of the auxiliary cam member. The clutch means includes a single clutch jaw adapted to engage the associated notch in order to ensure that the clutch means are brought into an operative state at a predetermined constant position relative to the associated shutter during one complete revolution of the latter without shifting the position of the shutter relative to the cam members.

Figure 1:
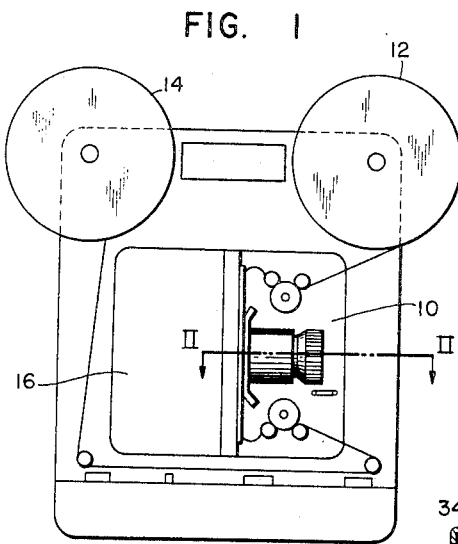

Referring now to the drawings and FIGURE 1 in particular thereon is illustrated a motion-picture projector embodying the principles of the invention. The projector comprises a machine frame 10 having mounted thereto the essential parts thereof, a feed and a takeup film reel 12 and 14 respectively, and a lamp housing 16.

Figure 2A:
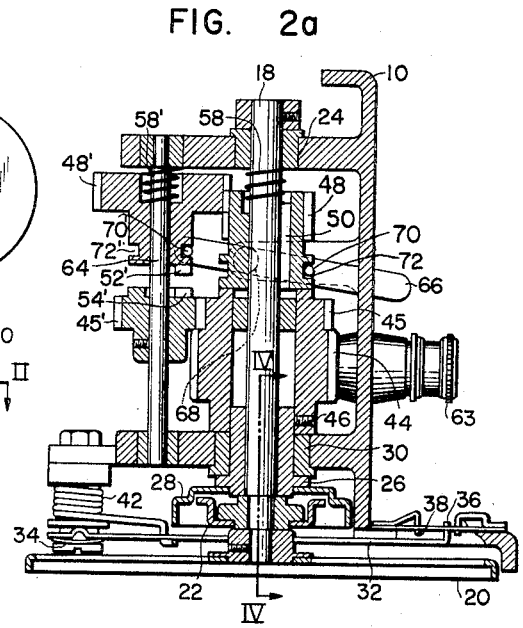

As shown in FIGURES 2a and b, a shutter shaft 18 along with a shutter 20 secured at one end and a main cam member 22 rigidly secured thereto adjacent the shutter is rotatably mounted on the other end portion in a bearing 24 and on the one end portion on a hub 26 of an auxiliary cam member 28. The bearing 24 is on the machine frame 10 with the hub 26 also rotatably supported by the machine frame 10 through a bearing 30.

Figure 3:
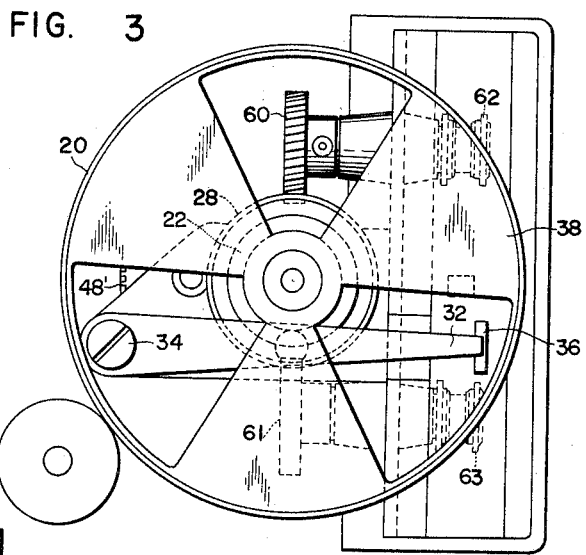
FIGURE 3 is a side elevational view of the device illustrated in FIGURES 2a and b.

The shutter 20 is of the conventional construction and is shown in FIGURE 3 as including three sectors although it may include any desired number of sectors.

As best shown in FIGURE 8, the main cam member 22 includes a generally cylindrical surface coaxial to the axis of the shutter shaft 18 and serving as a cam surface for vertically rocking a film feed claw as will be described hereinafter and a radial flange-shaped stepped bottom surface projecting outwardly from that end of the generally cylindrical surface remote from the shutter 20 and serving as a cam surface for horizontally rocking the feed claw. The auxiliary cam member 28 includes a cylindrical surface coaxial to the axis of the shutter shaft 18 and a radial flange-shaped stepped bottom surface substantially flush with the main cam bottom surface and serving as a cam surface for horizontally rocking the feed claw. Thus the both cam members form a channel-shaped annular space therebetween. The details of the cam members will be described hereinafter in conjunction with the operation of the present device.

As best shown in FIGURES 2a and b a film feed claw 32 is mounted at one end on a mounting stud 34 rigidly connected to the machine frame 10 and between the shutter 20 and the cam members 22 and 28 for vertical and horizontal rocking movements. The feed claw 32 has the other end portion bent away from the shutter 20 to project beyond a slit 36 cut in an aperture plate 38 fixed to the machine frame 10 (see FIGURE 3) for the purpose of intermittently transporting a length of cinefilm. As shown in FIGURE 4, claw 32 has a cam follower 40 movably fitted into the said annular channel confined between both cam members 22 and 28 and pushed against the internal side wall and bottom of the channel by the action of a helical spring 42 having one end anchored on the mounting stud 34 and the other end engaging the feed claw 32. Thus the cam follower 40 and therefore the claw 32 follows the cam surfaces of both cam members during their rotation.

As in the conventional projector a source of light is suitably disposed on that side of the aperture plate 38 remote from the shutter 20 although it is not shown in FIGURES 2a and b for purpose of simplification.

The hub 26 of the auxiliary cam member 28 has a worm and gear unit 44–45 rigidly coupled thereto through a set screw 46 for a purpose which will be apparent hereinafter. A gear 48 is mounted on the shutter shaft 18 through a key 50 for axial sliding movement but against rotational movement relative to the shutter shaft 18 and capable of engaging and disengaging from the gear 45. The gear 48 is provided on that end face opposed to the gear 45 with a single jaw 52 adapted to engage a notch 54 formed on the adjacent end face of the gear 45 to provide a dog clutch. The jaw 52 has a tapered free end portion as shown in FIGURE 5 for purpose which will be apparent hereinafter. The gear 48 is normally urged toward the gear 45 by the action of a compression spring 58 disposed between the other end face of the gear 48 and the bearing 24 around the shutter shaft 18.

The worm 44 meshes with a pair of spaced worm gears 60 and 61 operatively coupled to the respective sprocket wheels 62 and 63 for continuously transporting a length of cinefilm (see FIGURE 3).

The machine frame 10 has another shaft 64 disposed in spaced parallel relationship with respect to the shutter shaft 18. As seen in FIGURES 2a and b, the shaft 64 includes gears similar to the gears 45 and 48 and another dog clutch. The gears and associated components on the shaft 64 corresponding to those associated with the shutter shaft 18 are designated by the same reference numerals with a prime and need not be described in detail. However, it is to be noted that a gear 48' corresponding to the gear 48 is allowed to be rotated about the axis of the shaft 64. The gears 45' and 48' always mesh with the corresponding gears 45 and 48.

A train of gears composed of the gears 48, 48', 45' and 45 are designated to drive the auxiliary cam member 28 at a speed corresponding to a predetermined fraction of the standard number of rotations of the main cam member 22. If the shutter 20 includes $n$ sectors the predetermined fraction is $1/n$ and in the example illustrated is a third.

In order to maintain a constant position of the auxiliary cam member 28 relative to the shutter 20 or the main cam member 22 each time either of the dog clutches as above described is brought into its operative position, the gear 48 or 48' is arranged to engage the mating gear 45 or 45' at its predetermined single position during one complete rotation of the shutter by having the single jaw 52 or 52' engaging the associated notch 54 or 54'.

In order to cause the gears 48 and 48' to engage and disengage from the respective gears 45 and 45', an operating lever 66 is pivotably mounted on a pivot 68 on the machine frame 10 and includes a pair of pins 70 and 70' engaging the respective annular grooves 72 and 72' provided on the outer peripheries of hubs integral with the gears 48 and 48'. The lever 66 has two operative positions as illustrated in FIGURES 2a and b respectively in which it is held by any suitable locking means such as a click device or the like (not shown) well known in the art until it is desired to change the speed of rotation of the auxiliary cam member 28. From FIGURES 2a and b, it will be understood that with the lever 66 in either of its operative positions, one of the gears 48 or 48' engages the gear 45 or 45' associated therewith by having the jaw 52 or 52' fitted into the associated notch 54 or 54' as the case may be while the remaining pair of gears are disengaged from each other.

It is now assumed that the lever 66 is in its position as illustrated in FIGURE 2a. In other words, the jaw 52 is in engagement with the notch 54 while the jaw 52' is disengaged from the notch 54'. It is to be noted that as shown in FIGURE 5b, the central distances between the pins 70 and 70' and the pivot 68 are selected such that the jaws 52 and 52' partially engage the respective notches 54 and 54' at the same time.

With the operating lever 66 in its position illustrated in FIGURE 2a or 5a, it can be swivelled upwardly as viewed in FIGURE 2a or 5a to cause the jaw 52 to lift from the notch 54. This causes the jaw 52 to move from its position as illustrated in FIGURE 5a where it fully engages the notch 54 in its position as illustrated in FIGURE 5b where the tilted surface 56 of the jaw 52 contacts the upper end of one of the side walls, in this case, the righthand side wall of the notch 54.

In order to prevent the position of the auxiliary cam member 28 from varying with respect to the shutter 20 and hence the main cam member 22, the jaw 52 should be equal in width to the notch 54. With the jaw 52 having the tapered surface at its end portion according to the invention, a clearance A is formed between the jaw 52 and the notch 54 in their transient state as illustrated in FIGURE 5b. On the other hand, after the jaw and notch 52' and 54' have changed from their positions illustrated in FIGURE 5a to their positions as illustrated in FIGURE 5b a clearance B will be similarly formed therebetween. The shafts 18 and 64 rotate at different speeds from each other. Therefore if neither jaw has a tapered surface and the clearances A and B are not formed during partial engagement of the jaws with notches, then any simultaneous engagement of both clutches, even though it would be partial, could not at all occur.

However, the formation of the clearances A and B between the jaws and notches permits both dog clutches to rotate about the axes of the respective shafts through angle corresponding to the circumferential length of the sum of the clearances $A+B$ while they are maintained in partial engagement. On the other hand, the jaw 52' continues to push against the notch 54' by the action of the spring 58' to be necessarily in engagement with the notch 54' within that particular complete revolution in which the jaws began partially to engage the associated notches. In addition at the instant the jaw 52 has left the notch 54 the jaw 52' fully engages the notch 54' (see FIGURE 5c). This ensures that the auxiliary cam member 28 is prevented from varying its position relative to the shutter 20 and therefore the main cam member 22.

Figure 2B:
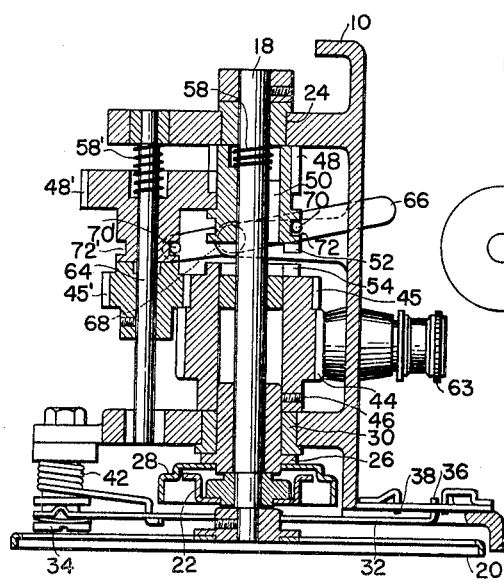

If it is desired to change the dog clutches from their positions as illustrated in FIGURE 2b or 5c where the jaw 52 is in disengagement from the notch 54 while the jaw 52' is in engagement with the notch 54' to their positions as shown in FIGURE 2a or 5a where the jaw 52 engages the notch 54 while the jaw 52' disengages from the notch 54', the operating lever 66 can be depressed to go through the reverse process from that above described as will be readily understood from the fact that the dog clutches are similar in construction to each other.

It will be apparent that as each jaw has a straight surface substantially perpendicular to the end face of the associated gear except for its tapered end portion that the jaw firmly engages the associated notch during the rotational movement without any tendency of the jaw to disengage from the notch.

Also it will be readily understood that during a change in position of one component relative to the other as in the case of a shutter and a cam it is not significant that the jaw is required only to be different in width from the notch to form a suitable clearance therebetween without the necessity of providing the tapered jaw and portion.

While the invention has been described in terms of the jaw having the tapered end portion, it will be understood that either or both of the jaw and notch may be provided with a tapered surface or surfaces. Also it will be understood that the combination of jaw and notch may be replaced by a combination of pin and hole.

It is to be noted that the clearances A and B are not necessarily equal in dimension to each other and that their dimensions can be suitabley determined in accordance with the ratio of the number of rotation of both shafts.

As previously described, the worm 44 drives the sprocket wheels 62 and 63 and is rigidly connected to the auxiliary cam member 28. For the normal projection effected at the standard frame transport speed, therefore, the main and auxiliary cam members 22 and 28 and the worm 44 are rotated as a whole so that the sprocket wheels 62 and 63 are driven at a film transport speed synchronized with the intermittent transport speed of the main cam member 22 rotating at the standard speed of rotation. Also for a slow-motion projection the auxiliary cam member is rotated at a reduced speed synchronized with a selected intermittent transport speed. This eliminates the necessity of providing any separate means for reducing the speed of the sprocket wheels.

It is now assumed that with the operating lever 66 in its position as illustrated in FIGURE 2a, an electric motor (not shown) is energized to drive through a suitable speed reduction mechanism (not shown) the shutter 20. at a predetermined speed such as a speed of 1080 r.p.m. corresponding to the standard frame transport speed of 18 frames per second for 8 mm. cinefilm. Since the operating lever 66 is in its lower position, the gear 48 is in engagement with the gear 45 by having the jaw 52 fitted into the notch and both gears are rotated at the assumed speed. The gear 48' meshing with the gear 48 is disengaged from the gear 45' and is rotated but it has no effect upon the system. Further the main and auxiliary cam members 22 and 28 and the worm 44 are rotated at the assumed speed.

Under the assumed conditions, the operation of both cam members 22 and 28 will now be described in conjunction with FIGURES 7 and 8. FIGURE 7 shows curves plotting relative positions of the various cams in ordinates against time in abscissas with the period of time for which the shutter 20 is in its closed position being designated by the hatched portion (see curve b). Three curves a, c and d correspond to the normal projection and any vertical line associated with these curves represents the same time point. Curves e and f correspond to a slow-motion projection for which the auxiliary cam member is rotated at a speed equal to a third of the speed of the main cam member.

It is assumed that the cam members 22 and 28 are rotated in the clockwise direction as viewed in FIGURE 8. When the cam follower 40 is in contact with the cam portion extending through an angle α of the circumferential main cam surface or the vertical cam the feed claw 32 rests in its lower advanced position as shown at curve a in FIGURE 7 but at the end of that cam portion it is horizontally retracted in the region of an angle η (see curve c in FIGURE 7) through which a horizontally extending ramp portion connecting the lower main bottom surface to the higher bottom surface extends (see FIGURE 8). During a further rotation of the main cam member 22 through an angle β the feed claw 32 is moved vertically upwardly by the vertically extending cam surface of the main cam, as shown at curve c in FIGURE 7 while it is horizontally held stationary in its retracted position.

During the succeeding rotation of the main cam member 22 through an angle γ the feed claw 32 is vertically held in its upper retracted position while at the beginning of that rotation the cam follower 40 follows a horizontally extending ramp portion extending through an angle η' of the main bottom surface to move the claw forwardly. When the main cam member is succeedingly rotated through an angle δ, the feed claw is moved downwardly while it is held horizontally in its advanced position. During this movement the feed claw transports one frame on the cinefilm. Then the process just described is repeated.

In this process, the auxiliary cam member 28 is rotated along with the main cam member 22 as the main cam functions to rock the feed claw in the horizontal direction in the region of each of angles μ' or μ through which a horizontally extending ramp portion connecting the one auxiliary bottom surface to the other bottom surface extends (see curve d, FIGURE 7 and FIGURE 8). As previously described, the horizontally extending surface on the auxiliary cam member 28 extends through a rotational angle equal to or less than that of the corresponding horizontally extending surface on the main cam member 23. In other words, the angle μ or μ' is equal to or less than the angle η or η'. In the example illustrated the angles μ and μ' are chosen to be less than the angles η and η' respectively. This measure causes the auxiliary cam member 28 to be ineffective for affecting the horizontally rocking movement of the feed claw 32. Thus only the main cam member 22 serves to carry out the normal projection at the standard frame transport speed.

In the example illustrated the angle β is equal to the angle θ thereby to cause a period of time β required to move the feed claw from its lowermost position to its uppermost position to be equal to a period of time θ during which the feed claw is held stationary in its retracted position although this measure is not essential. The reference characters ε and κ represent angles in the regions of which the feed claw is held stationary in its advanced position during one complete rotation of the main cam member. The reference characters ω and ω' have a similar meaning with respect to the auxiliary cam member.

For a slow-motion projection the operating lever 66 is raised from its position as illustrated in FIGURE 2a to its position as illustrated in FIGURE 2b. This permits the dog clutch 48'–45' to be put in its operative position while at the same time putting the dog clutch 48–45 in its inoperative position. Thus the auxiliary cam member 28 is rotated at a predetermined fraction, in this case, a third, of the speed of the main cam member 22. Under these circumstances, the feed claw 32 effects the abovementioned movement controlled by the main cam member 22 while the auxiliary cam member 28 effects one complete rotation per three complete rotations of the main cam member. By comparing curve $e$ illustrating the stroke of the auxiliary cam member with curve $f$ illustrating the resultant stroke of the main and auxiliary cam members it will be appreciated that the feed claw is prevented from horizontally moving twice per three vertical movements and is allowed to effect horizontal movement only once per three vertical movements with the result that one film frame is transported once per three vertical movements of the feed claw. In other words, the frame transport speed is 6 frames per second. In general, with the speed of the auxiliary cam member reduced to $1/n$ of the speed of the main cam member one film frame is transported once per $n$ vertical movements of the feed claw.

For a slow-motion projection, the feed claw 32 is maintained in engagement with the main cam member while the auxiliary cam member 28 prevents the feed claw 32 from engaging the cinefilm involved for a certain number of times per the standard number of rocking movements of the claw. However the auxiliary cam member has the horizontally extending surfaces extending through a rotational angle equal to or less than the corresponding surfaces on the main cam member. Therefore, even if the frame transport speed is greatly reduced, the feed claw effects its vertical rocking movement the same as for the standard speed of frame transport and effects horizontal movement along the same path as for standard frame transport speed, but less frequently. Also angle through which the shutter is closed is not required to increase and there is no fear that the feed claw might fail to engage the cinefilm.

While the invention has been illustrated and described in conjunction with certain preferred embodiment thereof it is to be understood that various changes in the details of construction and the combination and arrangement of the parts may be resorted to without departing from the spirit and scope of the invention.

What I claim is:

1. A device for changing the film-frame transport speed in a small-sized motion-picture projector with a shutter having $n$ sectors, comprising a film feed claw, a shutter shaft, main cam means rigidly mounted on said shutter shaft including a vertically extending cam surface for imparting to said feed claw a predetermined vertical rocking movement within a closure angle of the shutter and a horizontally extending cam surface for imparting to said feed claw a predetermined horizontal rocking movement within the closure angle of the shutter, said vertically and horizontally extending cam surfaces being integral with each other, auxiliary cam means rotatably mounted on the shutter shaft for relative rotation therewith for controlling the frequency of a predetermined horizontal rocking movement imparted to said feed claw within the closure angle of the shutter, said auxiliary cam means having a horizontally extending cam surface extending over an angle of action at most equal to the angle of action of the horizontally extending cam surface of said main cam member, means for connecting said auxiliary cam means to said main cam means to rotate both means together at the standard speed of frame transport for the normal projection, said connecting means including speed reduction means for reducing the speed of said auxiliary means to $1/n$ of the standard speed of frame transport for a slow-motion projection, and means holding said feed claw in resilient contact with said main and auxiliary cam means at all times while the main cam means effects rocking movement, the speed of the claw during horizontal rocking movement being controlled only by said main cam means and remaining unchanged between the normal and slow-motion projections.

2. A device for changing a film-frame transport speed as claimed in claim 1 wherein said connecting means include a clutch mechanism mounted on said shutter shaft and comprising one half thereof having a single jaw capable of engaging an associated notch formed on the other half thereof, a second shaft disposed in spaced parallel relationship with respect to said shutter shaft, a second clutch mechanism similar in construction to the first mentioned clutch mechanism rotatably mounted on said second shaft, an operating lever operative to change one of said clutch mechanisms from the inoperative position to the operative position while at the same time changing the other clutch mechanism from the operative position to the inoperative position, both of said clutch mechanisms having said jaw having a tapered end portion so that at a time point during operation of said operating lever both of said jaws simultaneously and partially engage said notches respectively with a clearance formed between each jaw and the associated notch.

References Cited

UNITED STATES PATENTS

| 1,334,057 | 3/1920 | Stringham | 352—180 |
| 3,252,748 | 5/1966 | Schellschmidt | 352—180 |
| 3,288,550 | 11/1966 | Saraber | 352—180 |

NORTON ANSHER, Primary Examiner

MONROE H. HAYES, Assisitant Examiner